United States Patent [19]  
Samuel et al.

[11] 4,360,120  
[45] Nov. 23, 1982

[54] SEALING COMPOSITIONS

[75] Inventors: David N. Samuel, Great Gransden; Kenneth M. Sinnott, Huntingdon, both of England

[73] Assignee: W. R. Grace & Co., Cambridge, Mass.

[21] Appl. No.: 277,552

[22] Filed: Jun. 26, 1981

[30] Foreign Application Priority Data

Sep. 25, 1980 [GB] United Kingdom ............... 8030987  
Feb. 2, 1981 [GB] United Kingdom ............... 8103170

[51] Int. Cl.³ ............................................. B65D 21/02
[52] U.S. Cl. ................................... 524/494; 215/341; 215/349; 215/352; 523/219; 523/223
[58] Field of Search ............. 260/29.7 S, 42.37, 42.47, 260/40 R, 33.6 A, 33.8 UA; 215/341, 349, 352; 220/81 R

[56] References Cited

U.S. PATENT DOCUMENTS

| 2,806,509 | 9/1957 | Bozzacco et al. | 154/28 |
| 3,036,928 | 5/1962 | Poole | 117/33 |
| 3,344,099 | 9/1967 | Cahill et al. | 260/23.7 |
| 3,381,837 | 5/1968 | Testa et al. | 215/40 |
| 3,409,567 | 11/1968 | Dinsdale et al. | 260/5 |
| 3,524,794 | 8/1970 | Jonnes et al. | 761/160 |
| 3,708,331 | 1/1973 | Leydon et al. | 117/95 |
| 3,751,525 | 8/1973 | Brenner et al. | 260/880 B |
| 3,767,607 | 10/1973 | Schneider | 260/27 BB |
| 3,830,776 | 8/1974 | Carlson et al. | 260/37 EP |
| 3,933,724 | 1/1976 | Mixell | 260/33.6 A |
| 4,042,732 | 8/1977 | Ferrar | 427/385 R |
| 4,053,443 | 10/1977 | Reick | 260/29 |
| 4,128,185 | 12/1978 | Wszolek | 215/344 |
| 4,138,384 | 2/1979 | Neumann | 260/29.7 S |
| 4,201,308 | 5/1980 | Neumann | 220/81 R |

FOREIGN PATENT DOCUMENTS

| 2345031 | 9/1973 | Fed. Rep. of Germany . |
| 2621115 | 5/1976 | Fed. Rep. of Germany . |
| 2229751 | 3/1974 | France . |
| 2343795 | 3/1976 | France . |
| 53-10660 | 1/1978 | Japan . |
| 1340730 | 12/1973 | United Kingdom . |
| 1566924 | 5/1980 | United Kingdom . |

OTHER PUBLICATIONS

"Rubber Technology", M. Morton, ed., Van Nostrand Reinhold Co., N.Y., 1973, p. 77.  
Handbook of Fillers and Reinforcemeent for Plastics, 1978, (Katz & Milewski), pp. 311 and 312.

Primary Examiner—Joseph L. Schofer  
Assistant Examiner—Bernard Lipman  
Attorney, Agent, or Firm—Edward J. Hanson, Jr.; William L. Baker

[57] ABSTRACT

Glass beads having a particle size of 1 to 200 microns are included as part or all of the filler in a sealing composition suitable for sealing container ends and which may be made by dispersing or dissolving solid styrene butadiene or other rubbery polymer and filler, and optionally also containing a tackifying resin, in a liquid medium.

6 Claims, No Drawings

SEALING COMPOSITIONS

This invention relates to sealing compositions suitable for sealing container closures such as top or bottom end closures of cans or replaceable or non-replaceable caps for jars or bottles. The compositions can be used for other sealing purposes but, for clarity, since they are formulated to meet the particular requirements of can and other container closure seals the invention is described solely in terms of compositions for sealing container closures.

Traditional container and sealing compositions have comprised a liquid medium in which has been dispersed or dissolved solid rubber or other polymeric material and which includes also fillers, tackifying resin and other additives. Some or all of these additives may have been milled into the solid polymer. The solid polymer may previously have been formed by coagulation of, for instance, rubber latex.

The liquid medium may be aqueous, for instance as in U.S. Pat. No. 3,409,567, the product then being a dispersion of the polymer. The liquid medium may be organic, for instance as in British Pat. No. 1,340,730, the product then being a solution, or a mixture of a solution and a dispersion of the polymer.

The liquid composition is applied to one at least of the mating surfaces of the closure and the sealing face of the container, generally to the closure, and is then dried on the surface. The closure is pressed onto the sealing face of the container so as to grip the container firmly and the composition provides a seal between the container and the closure. It is necessary that the composition should have appropriate rheological and other physical properties. For instance when applied to can ends it should flow adequately during sealing so as to distribute itself over the mating surfaces, but preferably it does not flow to such an extent that significant extrusion of the composition occurs along the walls of the can.

The seal provided by the composition should prevent ingress of bacteria. Generally it should also prevent loss of liquid, vacuum or gas.

In recent years there has been increased interest in sealing compositions based on a latex of a rubbery polymer and into which has been dispersed filler and other additives. However there is still a great need to be able to formulate the traditional types of compositions, that are based on solid polymers in such a way that they will reliably meet these requirements using readily available and economically attractive materials.

Typical fillers that have been used in the described dispersion or solution compositions include kaolin, talc, zinc oxide and calcium carbonate. Generally the amount of filler must not be too high or else the sealing properties are impaired.

A wide variety of other fillers have been proposed in the literature, including the patent specifications identified above. Also glass powder is included in a long list of fillers in British Pat. No. 1,566,924, which relates solely to latex based compositions. However glass powder is always obtained by crushing glass and so would inevitably cause very heavy wear of the nozzles by which the liquid composition is deposited onto the closure and so has not been adopted commercially.

In U.S. Pat. No. 3,409,567 it is mentioned that microballoons can be included for the purpose of making a porous layer.

It has been our object to modify the content of sealing compositions for sealing container ends and obtained by dispersing or dissolving solid polymer in a liquid medium in such a way that either the seal is improved or the amounts of either the rubber or other polymeric material or the tackifying resin, or both, can be reduced without reducing the sealing properties. It has also been our object to provide methods of sealing containers using such copositions, and to provide sealed containers.

A sealed container according to the invention has a closure sealed to it by a seal that includes a gasket formed of a rubbery polymer in which is dispersed filler including glass beads having a particle size of 1 to 200 microns. The sealed container may be fully sealed, for instance being a jar or a one piece can or a can sealed at both ends, or it may be a can that has a closure sealed to it one end but which is open at the other.

Such a sealed container can be formed from a container and a container closure in conventional manner. Thus the sealing face of the closure is lined with a liquid composition comprising rubbery polymer and a dispersion of the filler, the composition is dried to form a gasket, and the sealing face of the closure is compressed around the end of the container thereby sealing the closure to the sealing face with the gasket within the seal.

When the container is a bottle this gasket is trapped between the sealing face of the rim of the bottle and the overlying closure. Preferably however the container is a can in which event the gasket is trapped in the double seam formed in conventional manner by compressing the outer periphery of the container closure around an outwardly extending flange of the side wall and then pressing the flange and the closure periphery against the side wall of the container generally in a single operation.

We have found that the inclusion of glass beads does, as a generality, result in improved sealing properties compared to the same composition in which an equivalent volume of other filler (such as kaolin) is used in place of the glass beads, especially when the liquid medium is an organic solvent in which part at least of the rubbery polymer is dissolved. A number of sealing tests are used in the industry and are recognised as being meaningful and by saying that the sealing properties are improved we mean that the number of cans that fail a meaningful sealing test will be reduced. In some instances there may be no improvement in the results of some sealing tests but improvements in other tests will show that, despite this, there is a useful practical improvement.

The beads must be crush resistant, that is to say they must have sufficient strength to resist any risk of crushing during the sealing use to which the composition is to be subjected. Thus in a can end sealing composition the beads must have sufficient strength that they will not crush in the seal. The beads can be hollow, provided the walls are sufficiently strong to resist crushing but generally are solid. The beads may be ovoid in shape but preferably are substantially spherical. The particle size range of the beads is generally about 1 to about 100 microns, most preferably about 10 to 75 microns. The average particle size is generally about 5 to 100 microns, most preferably about 50 microns, with best results generally being achieved with an average size of about 20 to 50 microns.

The glass beads are preferably formed of soda glass, most preferably of "A" type glass. The beads have preferably been made by solidification of molten glass droplets and may have been treated by a fire polishing process, in conventional manner. Their surface may be untreated, i.e. in the form obtained by fire polishing, or they may have been given a surface coating of a variety of materials provided the surface coating does not interact with other components in the composition in such a way as to reduce significantly the sealing properties of the composition. For instance although many silane surface coatings can be tolerated in many compositions, it may be undesirable to incorporate a mercapto silane if the polymer of the composition is capable of being vulcanised by sulphur, as the mercapto silane may then react so strongly with the polymer as to interfere with the desired sealing properties.

Throughout this specification amounts of components of the composition, including amounts of glass beads and other fillers, are expressed as amounts by volume based on the volume of rubbery polymer, unless otherwise specified. For instance 10% glass beads means 10 volumes beads per 100 volumes rubbery polymer.

The amount of glass beads in the composition should be sufficient to give an improvement and is usually more than 0.7%. Generally the amount is below about 100%, and normally below about 50%, since greater amounts tend not to give significant further improvement. Generally the amount is at least about 3% and preferably at least about 5%. Generally the amount is up to about 30%. Typically the amount may be from about 5 to 50%, most preferably about 5 to 30%. If the amount is too low there will be no advantageous effect from the incorporation of the glass beads.

The filler may consist substantially only of glass beads, with the result that the composition may contain no significant amounts of other fillers although it may include fillers that are present primarily for their pigmentary purposes, for instance titanium dioxide which may be present in amounts of up to about 10 or 15%.

Good results are also obtained when the filler does include particulate inorganic material other than glass beads and this is generally preferred. The material other than glass may be present in an amount of about 0 to 150% (based on the volume of rubbery polymer), generally about 10 to 100% and preferably about 50 to 100%. Preferably the composition includes about 0.05 to 2 parts, most preferably about 0.1 to 1 part, by volume glass beads per part by volume other inorganic particulate filler.

Although the total volume of filler, including glass beads, can be similar to that conventionally used in commercial sealing compositions, for instance 25 to 45%, a particular advantage of the invention is that larger amounts of total filler may be used while still obtaining satisfactory sealing properties. For instance the total amount of filler, including glass beads, is usually at least about 20% (by volume based on the volume of rubbery polymer) and can be up to about 175%, for instance about 50 to 125%.

Titanium dioxide or other pigmentary filler (for instance carbon black) generally has a particle size below 5 microns but other particulate inorganic fillers that may be used in the invention generally have a particle size of from 1 to 50 microns. The filler should be substantially non-abrasive, so that it does not cause wear to the machinery by which the composition is mixed and lined onto the can or other end, and so materials such as crushed glass should not be used.

The preferred filler is kaolin or china clay or zinc oxide but other fillers include colloidal silica and other silicic fillers, synthetic silicate, calcium carbonate or sulphate, aluminium hydroxide, talc, dolomite, barium sulphate, or magnesium oxide or carbonate or silicate. Such fillers may have been surface treated, for instance in conventional manner.

Instead of modifying the colour of the composition by including particulate pigment some other colouring material, for instance a soluble dye, may be included.

The composition is formed from a rubbery polymer, that is to say a polymer that, when dried, forms a gasket that is sufficiently flexible and resistant to be capable of serving as a seal. Preferably the Mooney viscosity ($ML_{1+4}^{100° C.}$) is generally from 20 to 200, preferably 40 to 160. The rubbery polymer may be a natural polymer, for instance natural rubber, or a modified natural rubber such as styrene-modified or chlorinated or may be a synthetic polymer. Suitable synthetic rubbery polymers include butyl rubber, epichlorhydin rubber, propylene oxide rubber, polychloroprene, butadiene acrylonitrile copolymers, ethylene propylene copolymers, ethylene-propylene-diene terpolymers, styrene isoprene block copolymers, polybutadiene, styrene acrylic copolymers, polyvinylidene chloride, polyvinylidene chloride copolymers, plasticised polyvinyl chloride, polyvinyl chloride copolymers, plasticised polyvinyl acetate, polyvinyl acetate copolymers, plasticised polyvinyl propionate, polyvinyl propionate copolymers, polyacrylic acid copolymers, polymethylacrylic acid copolymers, acrylic ester copolymers, methacrylic ester copolymers, plasticised polystyrene, vinyl acetate copolymers with for instance ethylene, styrene butadiene block copolymers, styrene butadiene rubbers solution polymerised or emulsion polymerised, carboxylated styrene butadiene copolymers and liquid cross-linkable elastomers and plastomers. Blends may be used. Compositions based on vulcanisable polymers may include vulcanising agent. Naturally the rubbery polymer will be chosen having regard to, for instance, the type of composition that is being used for forming the seal. The preferred polymers are styrene butadiene rubbers having a styrene content of 15 to 60% preferably 18 to 45% by weight. They may have been made by any convenient polymerisation method, and thus may have been made by hot or cold polymerisation techniques.

Tackifier resins are generally included in can sealing compositions and they may be included in the compositions used in the invention. However because of the improved sealing properties obtained by the use of glass beads satisfactory results can often be obtained without a tackifier resin in the invention. Instead of using a tackifier resin a liquid plasticiser, such as white oil or other hydrocarbon oil, that softens the polymer may be used in amounts of for instance 1 to 60%, preferably 5 to 40%.

Best results are generally obtained when tackifier resin is included. Suitable materials are well known and are generally selected from synthetic hydrocarbon or petroleum resins, polyterpene resins, phenolic resin modified with natural resins such as rosin or terpene, xylene formaldehyde resin and modified products thereof, and esterified resins or other rosin type resins such as rosin, hydrogenated rosin, or hardened rosin. The amount of tackifier is generally at least 10% (by volume of rubbery polymer) but less than 250% and preferably less than 200%. Generally the amount is at least 15%.

The composition may be applied in the form of a melt consisting of the rubbery polymer and filler (including glass) and other optional additives. For instance the glass beads and filler may be mixed into the polymer while it is soft and the mass then fully melted before application to the closure.

The composition may be applied in the form of an organosol of the rubbery polymer, filler (including glass beads), plasticiser, organic solvent and other optional additives.

Both these compositions may be made from solid polymer. Preferably however the composition is a liquid medium in which solid rubbery polymer has been dispersed or dissolved and in which is dispersed the filler including glass beads. These compositions are novel. The liquid medium may be aqueous or organic.

Aqueous compositions will contain at least one stabiliser for stabilising the dispersion of rubber and filler. This stabiliser may be selected from any of the materials conventionally used for stabilising sealing compositions based on filled polymer latices. Such stabilisers include styrene maleic anhydride or other styrene copolymers, methyl cellulose, polyacrylamide, ethoxylate condensates, polyvinyl pyrolidone, ammonium oleate, and casein. Such stabilisers may be used in admixture for instance with other materials.

Organic compositions will contain one or more organic solvents in which some or all of the rubbery polymer will dissolve, any remaining polymer going into dispersion.

Suitable organic liquids which may be employed in preparing organic compositions include aliphatic and aromatic hydrocarbons, for example 3-methylheptane, hexane, heptane, xylene and toluene; chlorinated hydrocarbons, such as dichloropentane; ketones; ethers, ether-alcohols, and mixtures of these and other volatile organic liquids which together form media as known in the art for the selected elastomers.

The amount of organic or aqueous liquid used will depend on the maximum total solids concentration obtainable in the final composition consistent with solubility of the polymer, ease in preparing the composition, storage stability of the composition, and application of the composition to the can end using high speed automatic lining equipment. In general, the amount of solvent or water employed is such as to yield a composition having a solids content of from 20% to 85% by weight or more usually 30 to 75% when the liquid medium is an organic solvent.

The compositions may include minor amounts, e.g. up to 1% or at most 5% by volume, of other additives that are conventional in sealing compositions, such as viscosity increasing agents (for instance ammonium alginate, bentonite or gum karaya or high molecular weight polyacrylic acid), surfactants, anti-oxidants (for instance phenolic or amino anti-oxidants), corrosion inhibitors, pH adjusters (for instance ammonia, primary amines, sodium hydroxide or sodium carbonate) and bactericides.

Preferred compositions formed from solid rubbery polymer are based on organic solvents. They are generally made by blending the solid rubber with filler and optional additives such as anti-oxidants in an internal mixer, for instance a Banbury mixer. The solid rubber stock thus obtained is comminuted and dissolved in the chosen solvent or solvent mixture in conventional manner. If tackifying resin is to be introduced it may be added to the solvent or it may be blended into the solid rubber stock.

Aqueous dispersions may be made by milling the solid rubber with filler and other optional additives, including also generally any tackifying resin, using an internal mixer, for instance a Banbury mixer, so as to form a rubber stock. This rubber stock is then dispersed in water in conventional manner, for instance using a Z-blade type of mixer. Additional components, for instance thickening agent and more water, may be added to the dispersion to alter its consistency. Instead of including all the major additives in the rubber stock some may be added to the dispersion. For instance the rubber may be milled with some of the additives and then dispersed in water and other major additives introduced at this stage. For instance the glass beads may be added to the aqueous dispersion obtained by dispersing solid rubber and optionally some of the filler.

Instead of using compositions formed from solid polymers, the compositions may be made by mixing glass beads, and optionally other filler, into a latex of a rubbery polymer often in the presence of optional minor additives such as those described above and known to those skilled in the art. Such compositions and their preparation are described in detail and are claimed in our copending application U.S. Ser. No. 277,551 filed even date herewith, the entire disclosure of which is incorporated herein by reference.

Some non-limiting examples of the invention are now given.

In these sealing properties are identified by two sets of quantitative values which are referred to as "biological seal" and "sterilisation extrusion". These are recorded as follows:

"Biological seal"

The composition is lined into can closure (often termed can ends) and dried in conventional manner, the amount of the compositions being such as to give the dry film volume generally recommended for the particular size. Cans having a soldered side seam are then filled with a hot liquid nutrient, typically at a temperature of 97° C., leaving a small headspace. The test closures are double seamed onto these filled cans whilst simultaneously injecting steam into the headspace. The closed cans are then sterilised, typically at 121° C. for 30 minutes, and after sterilisation are immediately cooled in water containing gas-producing, non-pathogenic micro-organisms capable of growth in the aforementioned nutrient. After cooling and whilst still wet with the cooling water, the cans are subjected to a controlled deformation at the junction of the side seam and the double seam of the test closure. After incubation for six days at an elevated temperature optimum for the growth of the micro-organism, followed by one day at ambient temperature, the cans are examined visually and the number of swollen cans recorded. The retained vacuum in the remaining cans is measured. Cans having a low retained vacuum and the swollen cans are considered to have reached this condition through failure of the seal in the test closure. The swollen and low vacuum cans are termed failures and the "biological seal" value is the failure rate expressed as the number of such cans per thousand tested. Because of the procedures used the number of failed cans per thousand in this biological seal test is of course very must greater than that which would occur with commercially packed cans sealed with these compositions.

"Sterilisation extrusion"

The composition is lined into can closures and dried, in conventional manner, the amount of the composition being such as to give a dry film volume approximately 20% greater than that generally recommended with the particular closure size. Cans are filled with water at typically 70° C. to leave no headspace and test closures are double seamed onto these filled cans. The closed cans are then sterilised typically at 130° C. for one hour and allowed to cool to room temperature before examination. The number of protrusions of compound from the double seam along the outside wall of the can body at the test closure are counted, typically on a sample of 10 cans for each composition. Large protrusions are counted as appropriate multiples of the typical, more commonly occurring, small protrusions. The average number of protrusions per can is recorded as the value for "extrusion". This value should be as low as possible, preferably below 10 under the conditions of the test. However, because of the extreme conditions of the test, greater values than this are commercially tolerable.

Since the extrusion and biological seal results will vary according to, for instance, variable conditions under which the tests are carried out comparisons should, in general, be made only between results within a single example. It is desirable that the "biological seal" and "sterilisation extrusion" values should be as low as possible. The following examples show that the inclusion of glass beads generally reduces the values, thus demonstrating improved sealing, in comparative compositions and that good sealing performance can be obtained even when, for instance, the composition contains widely ranging proportions of ingredients and widely differing ingredients.

In each of the examples the filler consists of the glass beads (if present) and the stated inorganic particulate material (if present) which generally has a particle size of 1 to 50 microns although $TiO_2$ may have a particle size down to $0.1\mu$. Unless otherwise stated the glass beads are formed from molten soda glass and unless otherwise stated the beads have particle sizes between 1 and 53 microns, with an average particle size of about 35 microns.

In each of the examples the rubbery polymer is supplied with minor amounts of conventional additives known to those skilled in the art and is combined with the specified amounts of titanium dioxide, filler, and tackifier (when present). In each of the examples the amount of organic solent or water is selected so that the composition has a solids content, and therefore a viscosity, suitable for the apparatus being used for depositing the composition on the can closure. Generally it is from 30 to 75% by weight.

In each example the composition is lined onto the can closure, dried, and then tested in the described manner.

In each of examples 1 to 8 all the stated ingredients, including solid rubbery polymer, are milled together in conventional manner on a Banbury mixer to form a filled rubber stock. This is then comminuted and distributed in an organic solvent in conventional manner with stirring to form a stable dispersion or solution.

In Example 9 filled solid rubber stock is formed and then dispersed in water in conventional manner.

In Examples 10 to 13 the compositions are made by mixing the filler and tackifier into a latex of the rubbery polymer.

All quantities are expressed as parts by volume unless stated otherwise, except that the content of styrene in styrene butadiene rubbers and the solids content of latices are expressed as percentages by weight.

EXAMPLES 1 TO 4

These are formulated from
Commercial grade hexane
Polyterpene tackifier resin (mp 115° C.)
2 Titanium dioxide
100 Rubbery polymer
Filler In Examples 1 and 2 the rubbery polymer is
67.5 Butyl rubber (isobutylene-isoprene copolymer)
32.5 SBR containing 44% styrene and having a Mooney viscosity of 55–75

In Example 3 the rubbery polymer is an ethylene propylene rubber having a Mooney value of 35–40. In Example 4 the rubber polymer is a styrene butadiene block copolymer having a styrene content of 30% and the solvent is toluene instead of hexane.

The following results are obtained.

| Test | Filler | Tackifier | Biological Seal | Sterilisation Extrusion |
|---|---|---|---|---|
| 1A | 7 Synthetic Silicate + 22 Kaolin | 50 | 360 | 0.0 |
| 1B | 7 Glass beads + 22 Kaolin | 50 | 255 | 0.1 |
| 1C | 7 Synthetic Silicate + 22 Glass beads | 50 | 125 | 0.1 |
| 1D | 29 Glass beads | 50 | 190 | 0.0 |
| 2A | 7 Synthetic Silicate + 22 Kaolin | 50 | 225 | 11.5 |
| 2B | 16 Kaolin 11.5 Glass Beads | 44.5 | 145 | 6.2 |
| 2C | 34 Kaolin 11.5 Glass Beads | 44.5 | 130 | 0.8 |
| 2D | 16 Kaolin 11.5 Glass Beads | 67 | 130 | 0.8 |
| 2E | 34 Kaolin 11.5 Glass Beads | 67 | 180 | 1.9 |
| 3A | 15 Kaolin 0 Glass Beads | 41 | 95 | 59.8 |
| 3B | 0 Kaolin 15 Glass Beads | 41 | 45 | 69.8 |
| 4A | 16.5 Kaolin 0 Glass Beads | 45 | 35 | 0.4 |
| 4B | 0 Kaolin 16.5 Glass Beads | 45 | 0 | 8.6 |

EXAMPLE 5

Commercial Grade Acetone
100 Butadiene Acrylonitrile rubber
3 Titanium dioxide
2 Zinc Oxide
35.5 Stabilised ester of wood rosin
43.5 Filler

| Test | Filler | Biological Seal | Sterilization Extrusion |
|---|---|---|---|
| 5A | 25.5 Kaolin 18 Calcium Carbonate | 370 | 0.0 |
| 5B | 25.5 Glass Beads 18 Calcium Carbonate | 90 | 0.2 |
| 5C | 25.5 Kaolin 18 Glass Beads | 60 | 0.0 |
| 5D | 43.5 Glass Beads | 25 | 0.5 |

EXAMPLES 6 TO 8

These are formulated from
Commercial grade hexane

Tackifiers
3 Titanium dioxide
Filler
100 Rubbery polymer

In Example 6 the rubbery polymer is 70 parts hot polymerised styrene butadiene rubber having 23% bound styrene and a Mooney value as defined above of 50–58, and 30 parts hot polymerised styrene butadiene rubber having 43% bound styrene and a Mooney value of 40–50.

In Example 7 the rubbery polymer is 50 parts cold polymerised styrene butadiene rubber having 23% bound styrene and a Mooney value as defined above of 50–54, and 50 parts hot polymerised styrene butadiene rubber having 43% bound styrene and a Mooney value of 40–50.

In Example 8 the rubbery polymer is 63 parts solution polymerised 97% CIS content polybutadiene having a Mooney value as defined above of 45, 37 parts hot polymerised styrene butadiene having a styrene content of 43% and a Mooney value of 40–50.

The following results are obtained.

| Test | Kaolin | Glass Beads | Pentaerythritol ester of wood rosin | Hydrocarbon resin tackifier | Biological seal | Sterilisation Extrusion |
|---|---|---|---|---|---|---|
| 6A | 36 | 9.5 | 33.5 | 35.5 | 110 | 8.8 |
| 6B | 36 | 9.5 | 56.0 | 58.5 | 205 | 9.5 |
| 6C | 22.5 | 23.5 | 33.5 | 35.5 | 75 | 2.2 |
| 6D | 22.5 | 23.5 | 56.0 | 58.5 | 80 | 2.7 |
| 7A | 53 | 0 | 60.5 | 63.5 | 550 | 17.8 |
| 7B | 25 | 28 | 60.5 | 63.5 | 290 | 12.5 |
| 8A | 35 | 0 | 55.5 | 58 | 660 | 79.8 |
| 8B | 10 | 25 | 55.5 | 58 | 170 | 22.2 |

EXAMPLE 9

Water
100 Styrene butadiene rubber containing 44% styrene and having a Mooney value as defined of 70–90
24 Hydrogenated methyl ester of wood rosin
11 Maleic anhydride adduct of glycerol ester of wood rosin mp 120° C.
11.5 Glycerol ester of wood rosin mp 90° C.
12 Casein
Filler

| Test | Filler | Biological Seal | Sterilisation Extrusion |
|---|---|---|---|
| 9A | 14.4 Zinc Oxide | 105 | 55 |
| 9B | 13.7 Zinc Oxide 0.7 Glass Beads | 35 | 52 |
| 9C | 13.0 Zinc Oxide 1.4 Glass Beads | 70 | 51.5 |
| 9D | 10.8 Zinc Oxide 3.5 Glass Beads | 35 | 45.4 |
| 9E | 7.2 Zinc Oxide 7.2 Glass Beads | 45 | 40.6 |
| 9F | 14.3 Glass Beads | 5 | 51 |
| 9G | 14.4 Zinc Oxide 5.9 Glass Beads* | 35 | 56.7 |

*In test 9G the glass beads were mixed into the dispersion formed by dispersing in water the rubber-zinc-oxide stock.

EXAMPLES 10 TO 13

In Examples 10 to 12, 30 parts filler and 22 parts hydrocarbon tackifying resin (when present) are mixed with 3.2 parts titanium dioxide and 5 parts stabiliser and 100 parts styrene butadiene rubber, present as a latex. In Examples 10 and 11 the latex has a solids content of 66 to 69% by weight and the rubber contains 31 to 36% styrene and has been polymerised at 5° C. using fatty acid soaps and the rubber has a Mooney value (as defined above) of 100 to 130. In Example 12 the latex has a solids content of 67%, a bound styrene content of 32% and a Mooney value of 115.

In Example 13, the composition is prepared in the same way except that the polymer is as stated. The composition contains 22 parts hydrocarbon tackifier resin. In all the examples where this is used it is a polymer of mixed 5-C alkenes having a melting point of about 100° C.

| Test | Filler | Tackifying resin | Biological Seal | Sterilisation Extrusion |
|---|---|---|---|---|
| 10A | 30 Kaolin 0 Glass Beads | 22 | 225 | 38.6 |
| 10B | 0 Kaolin 30 Glass Beads 1–53μ | 22 | 10 | 2.7 |
| 10C | 0 Kaolin 30 Glass Beads 74–149μ | 22 | 10 | 23 |
| 10D | 0 Kaolin 30 Glass Beads 3–10μ | 22 | 90 | 27.9 |
| 11A | 30 Kaolin 0 Glass Beads | 0 | 495 | 28.7 |
| 11B | 0 Kaolin 30 Glass Beads | 0 | 75 | 2.7 |
| 12A | 93 Kaolin 24 Glass Beads | 153 | 215 | 8.8 |
| 12B | 93 Kaolin 24 Glass Beads | 204 | 225 | 17.3 |
| 12C | 47 Kaolin 24 Glass Beads | 102 | 150 | 3.5 |

EXAMPLE 13

| Test | Filler | | Rubber Copolymer | Biological Seal | Sterilisation Extrusion |
|---|---|---|---|---|---|
| 13A | 30 Kaolin | 0 Glass Beads | styrene acrylic ester copolymer | 375 | 20.4 |
| 13B | 0 Kaolin | 30 Glass Beads | | 25 | 1.8 |
| 13C | 30 Kaolin | 0 Glass Beads | polyvinylidene chloride | 590 | 6.4 |
| 13D | 0 Kaolin | 30 Glass Beads | | 65 | 12.9 |
| 13E | 30 Kaolin | 0 Glass Beads | styrene butadiene (45% styrene) + vulcanising agent | 55 | 3.7 |
| 13F | 0 Kaolin | 30 Glass Beads | | 5 | 2.4 |
| 13G | 27.5 Kaolin | 0 Glass Beads | 2-chlorobutadiene polymer and vinyl acetate maleic acid copolymer | 185 | — |
| 13H | 0 Kaolin | 27.5 Glass Beads | | 25 | — |
| 13I | 71 Kaolin | 0 Glass Beads | natural rubber and polychloroprene | 125 | 9.0 |
| 13J | 0 Kaolin | 71 Glass Beads | | 10 | 0 |

We claim:

1. A container having a closure sealed to it by a seal that includes a gasket formed of a composition comprising rubbery polymer in which is dispersed filler including an effective amount of crush resistant glass beads having a particle size of about 1 to about 200 microns.

2. A container according to claim 1 in which the glass beads have an average particle size of about 10 to about 75% microns and are present in the composition in an amount of about 5% to about 100% and in which the composition includes 0 to about 250% tackifier and filler additional to glass beads in an amount of 0 to about 150%, all percentages being by volume based on the volume of rubbery polymer.

3. A container according to claim 1 in which the glass beads have an average particle size of about 10 to about 50 microns and are present in the composition in an amount of about 5 to about 50% and in which the composition includes tackifier in an amount of about 15 to about 200% and includes filler in a total amount of about 20 to about 175%, all percentages being by volume based on the volume of rubbery polymer, and in which there are about 0.05 to about 2 parts by volume glass beads per part by volume other filler.

4. A container according to claim 1 in which the glass beads have an average particle size of about 20 to about 50 microns and are present in the composition in an amount of about 5 to about 30% by volume based on the volume of rubbery polymer.

5. A container according to claim 1 in which the rubber polymer has a Mooney viscosity ($ML_{1+4}^{100° C.}$) of from 20 to 200.

6. A container according to claim 1 in which the rubbery polymer is selected from styrene butadiene rubber, styrene butadiene block copolymers, polybutadiene, styrene acrylic copolymers, butadiene acrylonitrile copolymers, polyvinylidene chloride and butyl rubber.

* * * * *